United States Patent
Yu

(10) Patent No.: US 9,286,858 B2
(45) Date of Patent: Mar. 15, 2016

(54) HIT TESTING METHOD AND APPARATUS

(71) Applicant: Tencent Technology (Shenzhen) Company Limited, Shenzhen (CN)

(72) Inventor: Yang Yu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 137 days.

(21) Appl. No.: 14/063,734

(22) Filed: Oct. 25, 2013

(65) Prior Publication Data

US 2014/0053112 A1 Feb. 20, 2014

Related U.S. Application Data

(63) Continuation of application No. PCT/CN2013/080730, filed on Aug. 2, 2013.

(30) Foreign Application Priority Data

Aug. 8, 2012 (CN) .......................... 2012 1 0280078

(51) Int. Cl.

| | |
|---|---|
| G06F 3/0484 | (2013.01) |
| G09G 5/08 | (2006.01) |
| G06F 17/30 | (2006.01) |
| H04N 21/4728 | (2011.01) |
| H04N 21/4725 | (2011.01) |
| G06F 3/038 | (2013.01) |
| A63F 13/42 | (2014.01) |
| A63F 13/577 | (2014.01) |

(52) U.S. Cl.
CPC ........ *G09G 5/08* (2013.01); *A63F 13/42* (2014.09); *A63F 13/577* (2014.09); *G06F 3/038* (2013.01); *G06F 3/04842* (2013.01); *G06F 17/30831* (2013.01); *H04N 21/4725* (2013.01); *H04N 21/4728* (2013.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 5,371,514 A | * | 12/1994 | Lawless et al. | 345/629 |
| 5,748,946 A | * | 5/1998 | Schneider | 345/501 |
| 6,219,048 B1 | * | 4/2001 | Miller et al. | 715/716 |

(Continued)

FOREIGN PATENT DOCUMENTS

CN 101082877 A 12/2007

(Continued)

OTHER PUBLICATIONS

Tencent Technology, ISRWO, PCT/CN2013/080730, Nov. 7, 2013, 10 pgs.

*Primary Examiner* — Xiao Wu
*Assistant Examiner* — Steven Elbinger
(74) *Attorney, Agent, or Firm* — Morgan, Lewis & Bockius LLP

(57) ABSTRACT

Embodiments of the present invention provide a hit testing method and apparatus. The method includes: replacing color values of pixels of objects displayed on the screen with corresponding identifier (ID) values of the objects; storing the ID values in a bitmap array, wherein each element of the bitmap array corresponds to one or more pixels of a respective object; in response to capturing a hit event, acquiring a hit coordinate on the screen corresponding to the hit event; determining a bitmap array element corresponding to the hit coordinate; and identifying an object related to the hit event, according to the ID value associated with the bitmap array element.

12 Claims, 5 Drawing Sheets

(56) References Cited

U.S. PATENT DOCUMENTS

| | | |
|---|---|---|
| 6,317,140 B1 | 11/2001 | Livingston |
| 2002/0197591 A1* | 12/2002 | Ebersole et al. ............. 434/226 |
| 2012/0113142 A1* | 5/2012 | Adhikari et al. ............. 345/633 |
| 2012/0317506 A1* | 12/2012 | Zhao et al. ................... 715/764 |

FOREIGN PATENT DOCUMENTS

| | | |
|---|---|---|
| CN | 101630254 A | 1/2010 |
| CN | 101635004 A | 1/2010 |
| CN | 101815173 A | 8/2010 |
| KR | 2008-0108844 A | 12/2008 |

* cited by examiner

HIT TESTING METHOD AND APPARATUS

RELATED APPLICATION

This application is a continuation application of PCT Patent Application No. PCT/CN2013/080730, entitled "HIT TESTING METHOD AND APPARATUS" filed on Aug. 2, 2013, which claims priority to Chinese Patent Application No. 201210280078.4, entitled "HIT TESTING METHOD AND APPARATUS", filed on Aug. 8, 2012, both of which are incorporated by reference in their entirety.

TECHNICAL FIELD

The disclosed implementations relate generally to the field of computer technologies, and in particular, to a hit testing method and apparatus.

BACKGROUND

Hit testing is a technology frequently used in a computer development (for example, game program development) process. It is used to determine whether a cursor (such as a mouse cursor or touch-point on a touch-screen interface) controlled by a user intersects a given object (such as a shape, line, or curve) on the screen. Generally, hit testing occupies quite a lot of central processing unit (CPU) resources, and therefore a quicker execution process of the hit testing is expected.

In the existing hit testing technology, a hit testing area of a rendered object in a scenario is pre-designed, where the hit testing area usually has a rectangular border. When a touch or hit event occurs in a rendered object list, hit testing determination is performed on each rendered object in the rendered object list in sequence, which is generally to determine whether a coordinate value of the touch or hit event is within a preset hit testing area of the object. If it is determined that a coordinate value of a touch or hit event is within a preset hit testing area of a certain object, an identifier (ID) value of the object is returned. In addition, when rendered objects overlap, a front-back layered relationship of the bodies needs to be considered. Before determination, it is first required to perform ranking of the objects or construct a parent-child tree structure for objects in the scenario, then the hit testing is performed from front to back, and an ID of a first successfully determined object is returned.

In the existing hit testing technology, by pre-designing the hit testing area, the profile contour of the object can be roughly simulated. However, when an object has an irregular profile and an ideal and precise hit testing result is expected, many formulas need to be introduced to define the profile, and sometimes the object profile cannot be precisely described by designing the hit testing area. In this case, it is difficult to precisely execute a hit testing for an irregular object. Moreover, during the hit testing, the more complicated the hit testing area of the object is, the more computer resources are consumed. Therefore, the hit testing technology in the prior art also occupies a large amount of computer resources.

In addition, in the existing hit testing technology, when a body profile is changed, and particularly when an irregular body profile is changed, it is difficult to update the hit testing area in time, making the hit testing result inaccurate.

SUMMARY OF THE INVENTION

Some embodiments of the present invention provide a hit testing method, in which a hit testing can be conducted accurately for objects having an irregular profile or when the profile changes for the object. Profile here refers to the outline or contour of the object.

Some embodiments of the present invention provide a hit testing apparatus, which can accurately conduct a hit testing for objects having an irregular profile or when the profile changes for the object.

The embodiments of the present invention adopt the following specific technical solutions:

A hit testing method to identify a hit on an object displayed on a screen of a computing device includes:

replacing color values of pixels of objects displayed on the screen with corresponding identifier (ID) values of the objects;

storing the ID values in a bitmap array, wherein each element of the bitmap array corresponds to one or more pixels of a respective object;

in response to capturing a hit event, acquiring a hit coordinate on the screen corresponding to the hit event;

determining a bitmap array element corresponding to the hit coordinate; and identifying an object related to the hit event, according to the ID value associated with the bitmap array element.

A hit testing apparatus includes: one or more processors; memory; and one or more program units stored in the memory and to be executed by the one or more processors, the one or more program units including an identifier (ID) value setting unit, a hit event capturing unit, and a hit testing unit, wherein:

the ID value setting unit is configured to replace color values of pixels of objects displayed on a screen with corresponding identifier (ID) values of the objects and store the ID values in a bitmap array, wherein each element of the bitmap array corresponds to one or more pixels of a respective object;

the hit event capturing unit is configured to capture a hit event and acquire a hit coordinate corresponding to the hit event; and the hit test unit is configured to the hit testing unit is configured to determine a bitmap array element corresponding to the hit coordinate and identify an object related to the hit event, according to the ID value associated with the bitmap array element.

As shown in the embodiments of the present invention, the color values of the pixels of an object are replaced with an ID value of the object. Moreover, the ID values of the object displayed on the screen are stored in a bitmap array corresponding to the coordinates of the pixels of the object on the screen. When a hit event is captured, a hit coordinate corresponding to the hit event is acquired. The bitmap array is retrieved according to the hit coordinate to determine a bitmap array element corresponding to the hit coordinate; and an object related to the hit event is identified according to an ID value of an object stored in the bitmap array element. As indicated, with the embodiments of the present invention, hit testing may be conducted by retrieving the ID value from the bitmap array and matching the ID with the object. Because a hit testing area does not need to be pre-designed, hit testing can be conducted accurately for objects having an irregular profile or when the profile changes, thereby improving the efficiency of the hit testing.

Moreover, with the embodiments of the present invention, when the ID value of each pixel is stored in bitmap array, a stored scenario can be smaller than an original object screen, thereby saving the storage space and improving the rendering efficiency and calculation speed.

BRIEF DESCRIPTION OF THE DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTIONS

In order to make the objectives, technical solutions, and advantages of the present invention more comprehensible, the present invention is further described below in detail with reference to the accompanying drawings.

In the embodiments of the present invention, to solve the hit testing problem for objects having irregular profiles and when an object's profile changes, a hit testing is conducted by a method including performing real-time rendering to obtain a bitmap array.

After first rendering is completed for an object scenario and a rendering result is displayed on a screen, preferably, as implemented in some embodiments of the present invention, a second rendering is further executed. In the second rendering, a color value of each pixel of an object is replaced with an ID value of the object, and other rendering effects unrelated to the hit testing are selectively disabled to improve the rendering efficiency. For example, the ID value may be a unique number or a unique numeral set so that the various objects may be effectively distinguished from one another. To allow effective setting of the color value, the ID value may be consistent with the format with which the color value is stored and used. The ID value may be set automatically by the program or may be manually set by the user. In some implementations, each object only has one ID value. After the color value of each pixel of the object is replaced with the ID value of the object, these pixels or the coordinates of these pixels may be stored in the form of a bitmap array (for example, a two-dimensional array), and then a corresponding bitmap array element is acquired according to a hit coordinate of a hit event, and an object related to the hit event is identified according to an ID value of an object in the bitmap array element.

The embodiments of the present invention are described below in detail in combination with a specific process.

Figure 1:
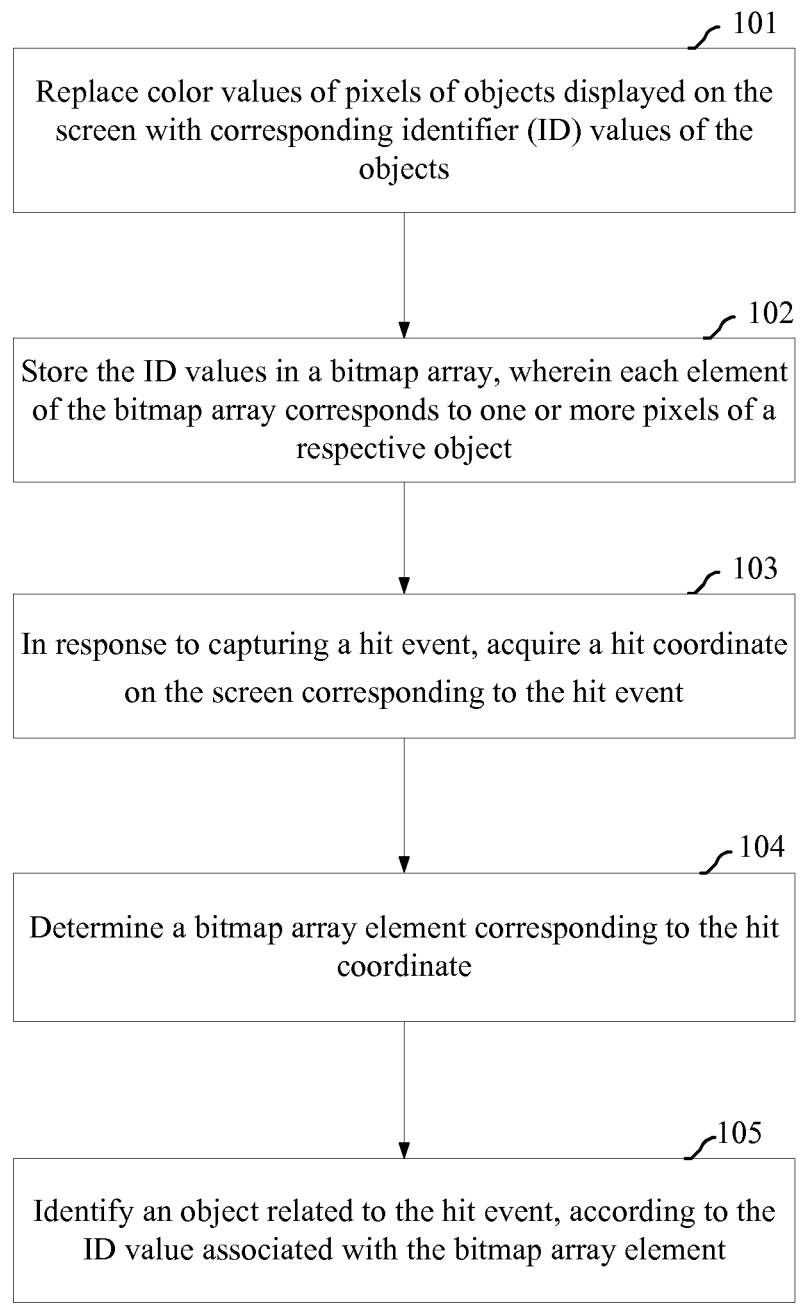
FIG. 1 is a flowchart of a hit testing method according to an embodiment of the present invention.

FIG. 1 is a flowchart of a hit testing method according to an embodiment of the present invention.

As shown in FIG. 1, the method includes the following steps:

Step 101: Replace color values of pixels of objects displayed on the screen with corresponding identifier (ID) values of the objects; and Step 102: Store the ID values in a bitmap array, wherein each element of the bitmap array corresponds to one or more pixels of a respective object.

Generally, data related to the object includes a series of data such as location information, color information, and shape information. In a general rendering process, by converting color information data of each pixel of an object into bitmap data, the objects can be presented in the form of a bitmap. This process may be called first rendering.

Generally, in the first rendering, to make an object stereoscopic, a rendering program needs to determine which body is in the front, which body is at the back, and which body is blocked. After acquiring, through a camera, a range that needs to be rendered, the rendering program needs to calculate an impact of a light source on the bodies of the objects. In addition, other factors such as the transparency and positioning of the objects also need to be considered.

Moreover, after using an area light source, the rendering program further needs to calculate a soft shadow, especially when the light sources in the scenario are utilizing special light source effects, the rendering program further needs to consume more system resources to calculate results of the effects. Afterwards, the rendering program further needs to calculate colors of the surface of the objects based on the material of the objects. Different effects are generated due to different types of material, different attributes, and different textures of the objects. Some common features of the rending process may include but are not limited to: shading, texture-mapping, bump-mapping, fogging/participating medium, shadows, soft shadows, reflection, transparency, translucency, refraction, diffraction, indirect illumination, caustics, depth of field, motion blur, non-photorealistic rendering, etc. . . .

In the embodiment of the present invention, to allow accurate and efficient hit testing, a second rendering conducted. The color value of pixels of each object is replaced with the ID value of the object, and the pixels of the object are stored in a bitmap array corresponding to the coordinates of the pixels of the object.

For example, in some embodiments, assuming that a hit testing scenario, such as a screen, has 960×640 pixels, and the hit testing scenario includes multiple objects, each occupying multiple pixels. First, the color value of the pixels of each object in the object scenario is set to a corresponding ID value of the object, and then the object scenario may be stored in a bitmap array (preferably, a two-dimensional array). E.g. A[m][n], where m corresponds to a horizontal coordinate in a coordinate system of the object scenario, and has a value ranging from 0 to 959, and n corresponds to a vertical coordinate in the coordinate system of the object scenario, and has a value ranging from 0 to 639. In this embodiment, a pixel coordinate system of the object scenario completely corresponds to the two-dimensional array A[m][n]. Since the ID values of the object replace the color values of the pixels, storing the pixels in the bitmap array is equivalent to storing the color value and thus the ID values of the object in the bitmap array. If the object has only one unique ID value, the color values of the pixels of the object would become uniform. The second rendering, however, does not require display of the rendering results.

For some cases where the hit testing does not require precision of single-pixel level, the size of a scenario of second rendering does not need to be the same as the scenario of the first rendering, and may be proportionally less, e.g., ½, ¼, ⅛ or less. Because hit testing is border sensitive, it may be conducted by compressing a touch point at the same scale in both directions to a size of a buffer area used in the second rendering, thereby improving the rendering efficiency.

In another embodiment, to save the storage space and accelerate the calculation speed, the storage of ID value of the object may be compressed at the same scale in both directions before being stored in the pixel coordinate system of the bitmap of the objects. The bitmap array corresponds to the coordinates of the pixels of the hit testing scenario.

For example, in an embodiment, assuming an object scenario has 960×640 pixels, the object scenario may include multiple objects in the pixel domain. First, the color values of the pixels of each object in the object scenario are replaced with a corresponding ID value of the object, and then the object scenario is stored through a two-dimensional array A[m] [n], where the value of m may range from 0 to 479, and the value of n may range from 0 to 319. In this embodiment, the two-dimensional array A[m] [n] is equivalent to compressing the coordinate system of the object scenario to ¼ of the original size by mapping a plurality of pixels on the screen to one element of the bitmap array at the same compression scale in both directions. In one implementation, the compression takes place before the storing of the ID values in the bitmap array. In another implementation, the bitmap array incorporates only the ID values of some of the pixels, e.g., only the even numbers.

For another example, in an embodiment, assuming that an object scenario has 960×640 pixels, the object scenario may include multiple objects. First, the color values of the pixels of each object in the object scenario are replaced with a corresponding ID value, and then the object scenario is stored through a two-dimensional array A[m] [n], where the value of m may range from 0 to 239, and the value of n may range from 0 to 159. In this embodiment, the array A[m] [n] is equivalent to compressing the coordinate system of the object scenario to ⅛ thereof.

In the embodiment of the present invention, the bitmap array may be stored in a dedicated buffer area within a memory, or stored in a storage medium, and specific storage media may include but not be limited to: a floppy disk, an optical disk, a DVD, a hard disk, a flash memory, a USB flash disk, a CF card, an SD card, an MMC card, an SM card, a memory stick, and an XD card.

In Steps 101 and 102, the color values of the pixels of the object are changed into the ID value of the object and are stored in a storage medium, for example, a buffer area, and may be used in the second rendering. Preferably, the specific hit testing may be executed through the second rendering. Steps 101 and 102 may be executed before or after the first rendering.

In general, rendering is a process of generating a digital image by means of computer programs. The displayed color of an object rendered in a certain scenario is decided by many factors such as, but not limited to: geometry, viewpoint, material, texture, lighting/illumination, shading, vertex color of the object, mapping, and mixing mode, etc. . . . . The rendering process usually takes into consideration all or part of the factors and makes calculations to determine how the object is to be displayed and/or used. As indicated above, some common features of the rendering process may include: shading, texture-mapping, bump-mapping, fogging/participating medium, shadows, soft shadows, reflection, transparency, translucency, refraction, diffraction, indirect illumination, caustics, depth of field, motion blur, and non-photorealistic rendering. The second rendering in the current invention, however, is mostly aiming to facilitate the hit testing and identification of objects. Therefore, certain aspects of regular rendering may not be necessary or may be detrimental in the second rendering in the current invention. For example, before the second rendering, the effects such as illumination and hybridization may be disabled to improve efficiency. In fact, most of the features as mentioned above may be disabled, especially the aspects of the features related to color rendering. For example, during texture mapping, to prevent the ID value of the object from being modified, only processes related to alpha channel operation may be allowed to be initiated. Since alpha channel operations deal specifically with transparency, the color of the object finally output to the buffer area is only related to the initially input color value (ID value) of the object. Other features such as illumination and motion blur may also be similarly modified to allow more efficient rendering in expectation for hit testing. In addition, for a transparent body, the border of the body can also be determined by starting and stopping an alpha test. Nevertheless, in some cases, especially with a built-in graphic process unit (GPU), too much disabling may cause more consumption of system resource so it should be flexible as to what aspects of regular rendering need to be disabled so that optimal effects may be acquired.

In particular, in some embodiments certain color characteristic rendering attributes are disable before the setting the color values of the pixels of each object to be the ID value of the object. Such color characteristic rendering attributes of the object may specifically include: an illumination attribute value, a material attribute value, and a mixing mode attribute value.

Step 103: Capture a hit event and acquire a hit coordinate corresponding to the hit event.

A bitmap may be displayed after the first rendering is completed, allowing a hit event of a user on the displayed bitmap to be captured, and a hit coordinate corresponding to the hit event is acquired. The hit event may include any intersection of the user-controlled cursor, such as a mouse cursor or a touch point) with any object on the screen displaying the objects. It is also noted that there is no specific requirement to display the bitmap.

As indicated, various sensing technologies may be used to detect the hit event and acquire the hit coordinate corresponding to the hit event, for example, touching a touch screen or clicking a mouse.

Step 104: Determine a bitmap array element corresponding to the hit coordinate.

Step 105: Identify an object related to the hit event, according to the ID value associated with the bitmap array element.

After the hit coordinate is acquired, the bitmap array may be queried according to the hit coordinate, to determine a bitmap array element corresponding to the hit coordinate, and an object related to the hit event is identified according to an ID value that is associated with the bitmap array element. In particular, the color value is stored in the bitmap array element and since the ID values of the objects have replaced the original color values, as indicated in Step 101, an ID value may be identified as the one associated with the bitmap array element that is determined. Since each object has a unique ID value, the object associated with the hit coordinate may be identified and the object is determined to the object related to the hit event.

When the pixel coordinate system of the object scenario completely corresponds to the bitmap array, the hit coordinate may be directly used to retrieve a bitmap array element from the bitmap array, wherein the bitmap array element corresponds to the hit coordinate.

When the pixel coordinate system of the object scenario does not completely correspond to the bitmap array, but is compressed at the same scale in both directions to match the bitmap array, the hit coordinate needs to be correspondingly compressed at the same scale before the bitmap array element corresponding to the hit coordinate can be identified. Alternatively, the bitmap array may be proportionally expanded before the hit coordinates may be used to query the bitmap array and identify the bitmap array corresponding to the hit event.

Figure 2:
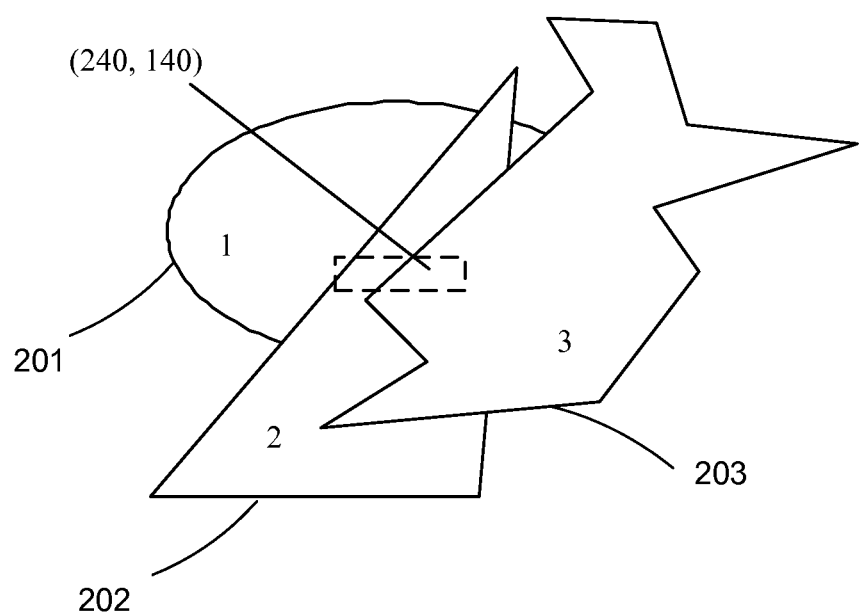
FIG. 2 is a schematic diagram showing three objects according to an embodiment of the present invention.
Figure 3:
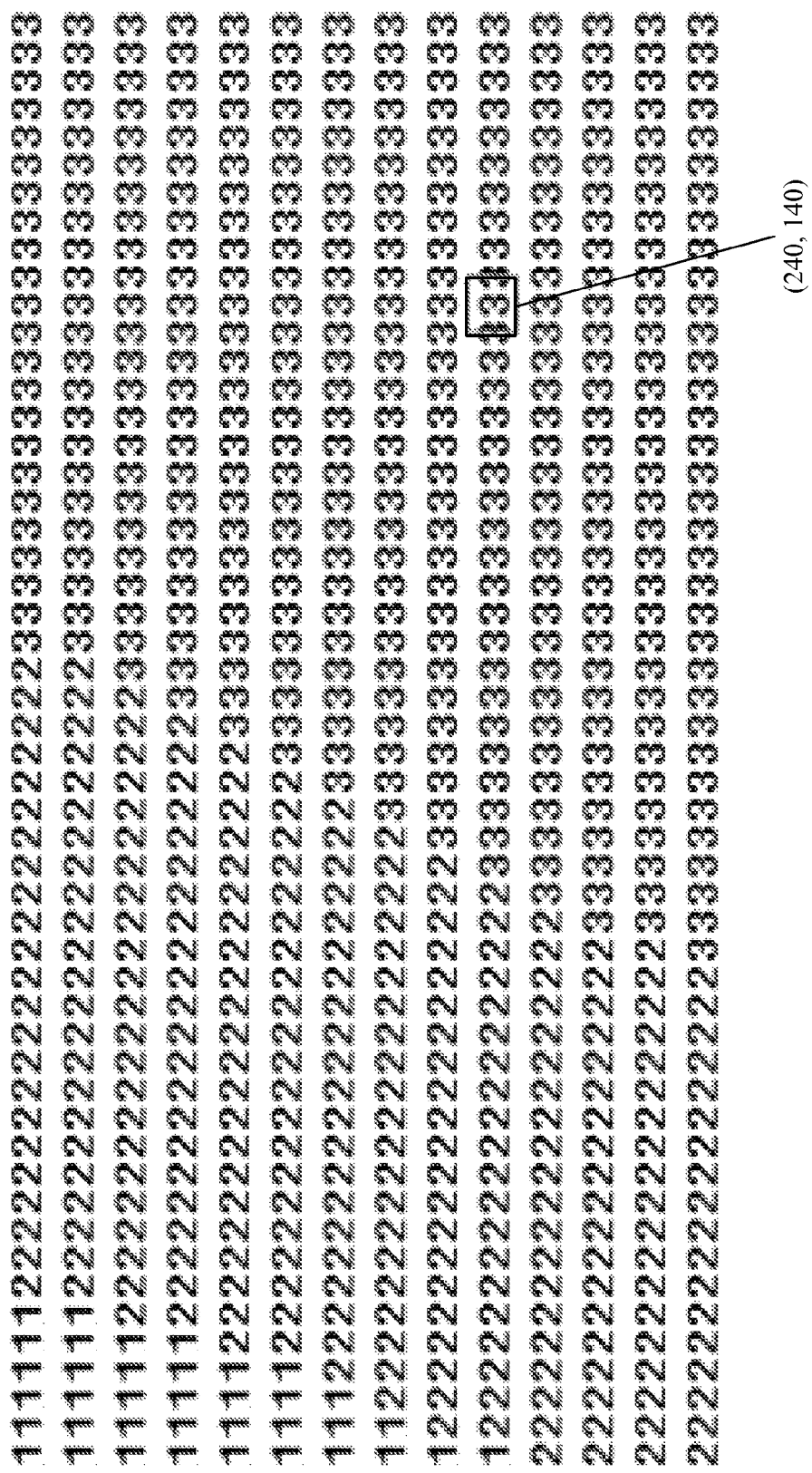
FIG. 3 is a schematic diagram showing part of a bitmap array according to an embodiment of the present invention.

As shown in some embodiments of the present invention, FIG. 2 is a schematic diagram of a hit testing scenario including three objects. FIG. 3 is a schematic diagram showing the storage of color values of pixels in a bitmap array according to some other embodiments of the present invention.

As shown in FIG. 2, the scenario includes three objects from bottom to top, which are a first object 201 having an ID value of 1, a second object 202 having an ID value of 2, and a third object 203 having a an ID value of 3, respectively.

The first object 201 is an elliptical body, whose ID value is 1; the second object 202 is a triangular body, whose ID value is 2; and the third object 203 is an irregular body, whose ID value is 3.

Because it is difficult to describe a border function of an irregular body through mathematics, when a hit occurs, it is quite difficult to precisely determine which object is related to the hit.

With the embodiment of the present invention, the color value of each pixel of the object is replaced with the ID value of the object, and then all the objects are stored in the buffer area in the bitmap array A[m][n]. Since the color values are replaced by the ID values, the color of each object is preferably uniform when each object has only one ID value.

In this embodiment, a part of the stored bitmap array may be shown in FIG. 3 and this bitmap array may be used to locate the hit event. In this exemplary embodiment, the pixel coordinate system of the object scenario completely corresponds to the bitmap array.

In this embodiment, when it is determined that the hit coordinate of the hit event is (240, 140), the object associated with the hit event may be accordingly identified by retrieving the ID value stored in the bitmap array element [239][139] (because the subscript of the array starts from 0, 1 needs to be subtracted from both the horizontal coordinate and the vertical coordinate of the hit coordinate) in the buffered bitmap array. As shown in FIG. 3, the color value, and thus the ID value, (encircled by a rectangle) that is retrieved from the buffered bitmap array element [239][139] is 3, so that it can be determined that the object associated with the hit event is object 203, because the third object 203 has an ID value of 3.

As an example, in some embodiments, assuming that the object scenario has 960×640 pixels, and the bitmap array A[m][n] stores ¼ of the object scenario through compression, that is, the value of m of the bitmap array may range from 0 to 479; and the value of n may range from 0 to 319. The two-dimensional array A[m][n] is equivalent to compressing the pixel coordinate system of the object scenario to ¼ thereof.

In this case, after the hit coordinate of the hit event is acquired, the hit coordinate may be scaled down so that both the horizontal coordinate and the vertical coordinate are divided by 2. The resulted coordinates are then used to retrieve the corresponding bitmap element from the buffered bitmap array and to determine the ID value of the object that is associated with the hit event. For example, when the hit coordinate is still (240, 140), to identify the object associated with the hit event, the bitmap array element [119][69] may be retrieved from the buffered bitmap array and the ID value associated with this bitmap array element needs to be accordingly determined.

As another example, in some embodiments, it is assumed that the object scenario has 960×640 pixels, and the bitmap array A[m][n] stores ¹⁄₁₆ of the object scenario through compression, that is, the value of m in the bitmap array may range from 0 to 119; and the value of n may range from 0 to 70. The two-dimensional array A[m][n] is equivalent to compressing the pixel coordinate system of the object scenario to ¹⁄₁₆ thereof.

In this case, after the hit coordinate of the hit event is acquired, it is scaled down so that both the horizontal coordinate and the vertical coordinate are divided by 4. Then, the resulted coordinates are used to retrieve the associated bitmap array element from the buffered bitmap array to determine the ID value of the object. For example, when it is determined that the hit coordinate is still (240, 140), the bitmap array associated with coordinates [59][34] are retrieved and thus the ID value associated therewith is identified, determining the object associated with the hit event at (240, 140).

The embodiments of the present invention are described above in detail through examples where the compression proportions are ¼, ⅛, and ¹⁄₁₆. Persons in the art may be aware that the specific proportions are merely exemplary, but not intended to limit the embodiments of the present invention.

Based on the detailed analysis above, an embodiment of the present invention further provides a hit testing apparatus.

Figure 4:
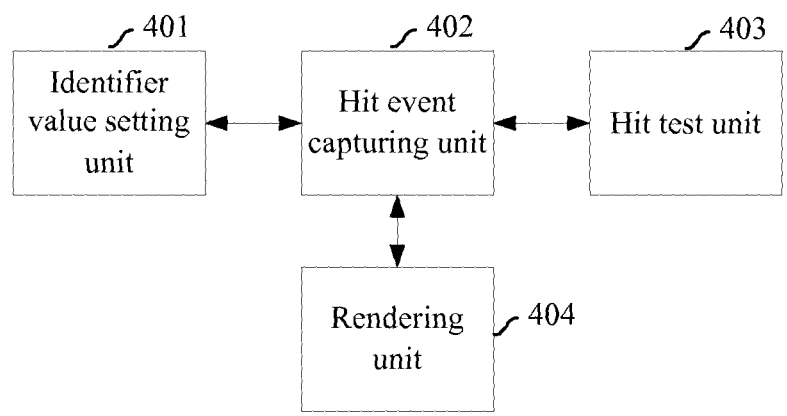
FIG. 4 is a structural diagram of a hit testing apparatus according to an embodiment of the present invention.

FIG. 4 is a structural diagram of a hit testing apparatus according to some embodiments of the present invention. As shown in FIG. 4, the apparatus includes an ID value setting unit 401, a hit event capturing unit 402, and a hit testing unit 403.

The ID value setting unit 401 is configured to replace color values of pixels of objects displayed on a screen with corresponding identifier (ID) values of the objects and store the ID values in a bitmap array, each element of the bitmap array corresponding to one or more pixels of a respective object.

The hit event capturing unit 402 is configured to capture a hit event and acquire a hit coordinate corresponding to the hit event.

The hit testing unit 403 is configured to determine a bitmap array element corresponding to the hit coordinate and identify an object related to the hit event, according to the ID value associated with the bitmap array element.

In some embodiments, the ID value setting unit 401 is configured to store the ID value of the object in a compressed form at the same scale in both directions to a pixel coordinate system of the object in the bitmap array corresponding to the coordinate of the pixels of the object.

In an embodiment, the apparatus further includes a rendering unit 404.

The rendering unit is configured to pre-render the pixel of the object into a bitmap, and optionally display the bitmap, and the hit event capturing unit 403 is configured to capture a hit event on the displayed bitmap, and acquire a hit coordinate corresponding to the hit event.

In some embodiments, the ID value setting unit 401 is configured to set the color value of the pixels of each object to be the ID value of the object, and disable at least one color characteristic rendering attribute of the pixels of the object; and store the pixels of the object in the bitmap array. The disabled color characteristic rendering attribute of the object may specifically include: an illumination attribute value, a material attribute value, and a mixing mode attribute value. In some implementations, all the color characteristic rendering attributes are disabled. In some other implementations, one or more of the color characteristic rending attributes are disabled.

In an embodiment, the hit testing unit 403 is configured to query the bitmap array for a bitmap array element that is corresponding to the hit coordinate; take a stored ID value of an object from the bitmap array element; and determine an object corresponding to the ID value as an object related to the hit event.

Figure 5:
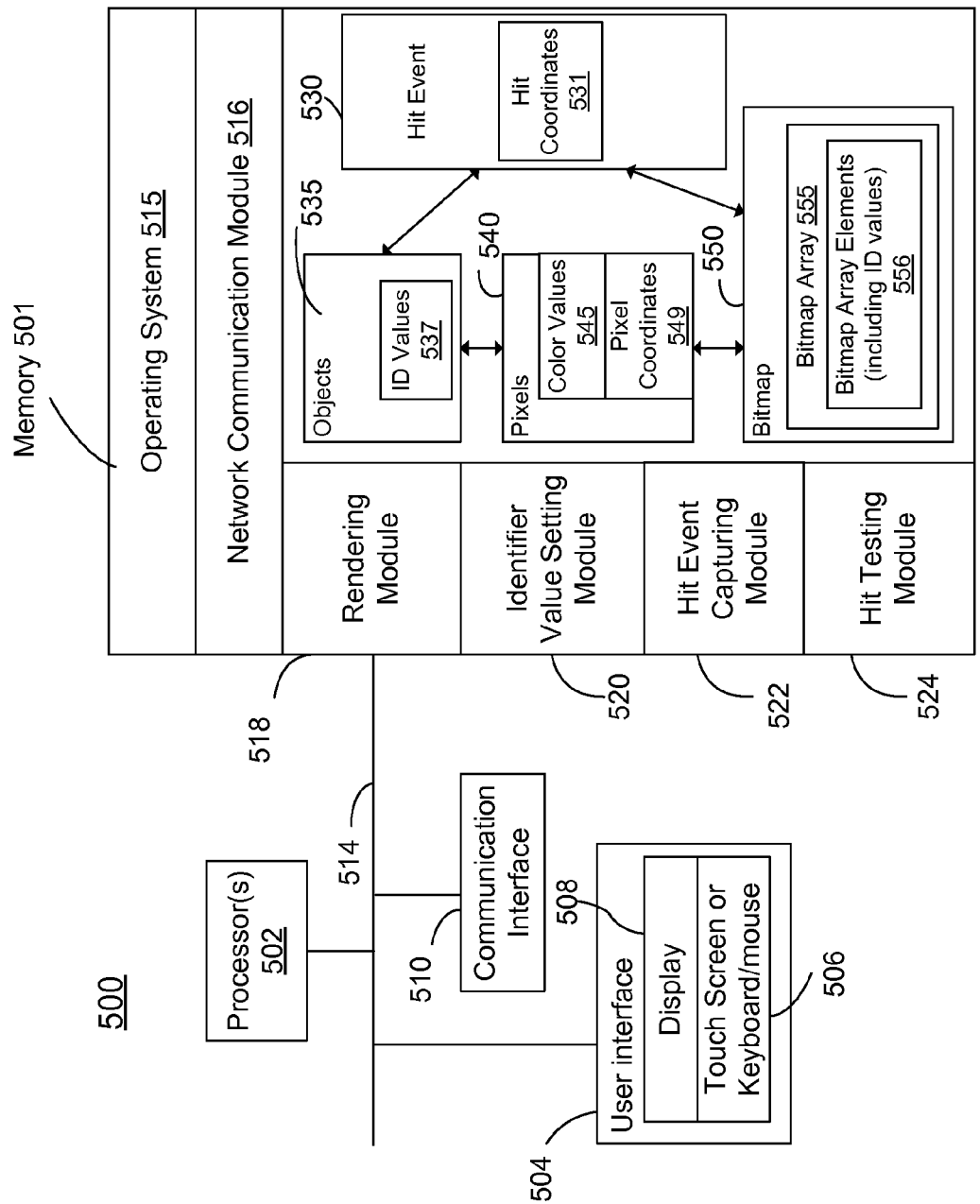
FIG. 5 is a block diagram of a hit testing apparatus according to an embodiment of the present invention.

FIG. 5 is a block diagram illustrating different components of a hit testing apparatus 500 (e.g. a mobile terminal or a computer) according to some embodiments of the present invention. While certain specific features are illustrated, those skilled in the art will appreciate from the present disclosure that various other features have not been illustrated for the sake of brevity and so as not to obscure more pertinent aspects of the implementations disclosed herein. To that end, the device 500 includes memory 501; one or more processors 502 for executing modules, programs and/or instructions stored in the memory 501 and thereby performing predefined operations; one or more network or other communications interfaces 510; and one or more communication buses 514 for interconnecting these components.

In some implementations, the device 500 includes a user interface 504 comprising a display device 508 (e.g. a screen) and one or more input devices 506 (e.g., touch screen or keyboard/mouse). When the device 500 is a smart phone, the touch screen is both the display device 508 and the input device 506. The objects 535 are displayed on the display device 508 and the user uses the input device 506 to execute the hit event, initiating the process of identifying the object associated with the hit event.

In some implementations, the memory 501 includes high-speed random access memory, such as DRAM, SRAM, or other random access solid state memory devices. In some implementations, memory 501 includes non-volatile memory, such as one or more magnetic disk storage devices, optical disk storage devices, flash memory devices, or other non-volatile solid state storage devices. In some implementations, memory 501 includes one or more storage devices remotely located from the processor(s) 502. Memory 501, or alternately one or more storage devices (e.g., one or more nonvolatile storage devices) within memory 501, includes a non-transitory computer readable storage medium.

In some implementations, memory 501 or the computer readable storage medium of memory 501 stores the following programs, modules and associated information items, or a subset thereof:

- An operating system 515 that includes procedures for handling various basic system services and for performing hardware dependent tasks.
- A network communications module 516 that is used for connecting the device 500 to other devices (e.g., a remote on-line gaming server) via the communication network interfaces 510 and one or more communication networks (wired or wireless), such as the Internet, other wide area networks, local area networks, metropolitan area networks, and so on.
- A rending module 518 to pre-render the pixels 540 of the object 535 into a bitmap 550 and display the bitmap 550.
- An ID value setting module 520 to replace color values 545 of pixels 540 of each object 535 with an identifier (ID) value 537 of the object 535 and store the pixels 540 in a bitmap array 555 corresponding to coordinates 549 of the pixels 540 of the object 535;
- A hit event capturing module 522 to capture a hit event 530 and acquire a hit coordinate 531 corresponding to the hit event 530;
- A hit testing module 524 to acquire a bitmap array element 555 corresponding to the hit coordinate 531 and identify an object 535 related to the hit event 530, according to the ID value 537 associated with the bitmap array element 549.
- Information items such as but not limited to the objects 535, the ID values 537 associated with the objects 535; the pixels 540 of the objects 537, wherein each pixel has a color value 545 and a pixel coordinate 549; the bitmap 550 of the hit testing scenario, wherein the bitmap 550 is associated with a bitmap array 555 containing a number of bitmap array elements 556 corresponding to the pixel coordinates 549, in the same number or proportionally.

As indicated above, the corresponding relationship of the objects 535 and the bitmap 550 are established by setting the color values 545 of the pixels 540 of the objects 535 to be the ID values 537 of the objects. The pixels 540, together with the color values 545 (and thus the ID values 537) and the pixel coordinates 549 are stored in the bitmap array 555. The individual ID values are associated with the bitmap array element 556 of the bitmap array 555, wherein the bitmap array 555 has the same number of bitmap array elements 556 as the pixel coordinate 549 or a reduced number thereof at the same scale in both directions of the bitmap. The hit event 530 is captured and the hit coordinates 531 are captured before the hit coordinates 531 are matched to the bitmap array 555, where a bitmap array element 556 is identified, thus identifying an associated pixel 540 and the color value 545 of the pixel 540. Since the color value 545 is the ID value 537 of an object 535, the object 535 associated with the hit event 530 is thus identified.

In this process, the steps of setting the color values 545 to be ID values 537 (using ID values 537 to replace the original color values) can be viewed as a second rending process. As indicated above, a regular rendering process is usually very complex and includes a number of processes dealing with multiple features such as but not limited to: shading, texture-mapping, bump-mapping, fogging/participating medium, shadows, soft shadows, reflection, transparency, translucency, refraction, diffraction, indirect illumination, caustics, depth of field, motion blur, and non-photorealistic rendering. To enhance efficiency, certain features may be disabled before the second rendering process. From another perspective, in some processes, certain aspects involving color of the object may be disabled so that the set color value of the object is not altered, ensuring a predictable hit testing result and accurate identification of the object.

As indicated above, with the implementation of the present invention, the hit testing is conducted by retrieving the ID values in the bitmap array. Because a hit testing area does not need to be pre-designed, the hit testing can also be accurately executed for objects having an irregular profile or when the profile changes, thereby improving the accuracy of the hit test.

Moreover, in the embodiment of the present invention, when the ID value of each pixel is stored as bitmap data, a stored scenario may be smaller than the original object scenario, thereby saving the storage space and improving the rendering efficiency and calculation speed.

The above descriptions are merely exemplary embodiments of the present invention, but not intended to limit the protection scope of the present invention. Any modification, equivalent replacement, or improvement made without departing from the spirit and principle of the present invention should fall within the protection scope of the present invention.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms "first," "second," etc., may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A hit testing method to identify a hit on an object displayed on a screen of a computing device, the method comprising:
    replacing color values of pixels of objects displayed on the screen with corresponding identifier (ID) values of the objects;
    storing the ID values in a bitmap array, wherein each element of the bitmap array corresponds to a plurality of pixels of a respective object;
    in response to capturing a hit event, acquiring a hit coordinate on the screen corresponding to the hit event;
    determining a bitmap array element corresponding to the hit coordinate; and
    identifying an object related to the hit event, according to the ID value associated with the bitmap array element,
    wherein the steps of replacing color values of pixels of objects displayed on the screen with corresponding ID values of the objects and storing the ID values in a bitmap array further comprise:
        replacing color values of pixels of an object to be the identifier (ID) value of the object;
        disabling at least one color characteristic rendering attribute of the pixels of the object;
        storing the ID value of the pixels in the bitmap array; and
        initiating only processes related to alpha channel operation during texture mapping to prevent the ID value of the object from being modified.

2. The hit testing method according to claim 1, further comprising:
    pre-rendering pixels of an object to be displayed on the screen into a bitmap; and
    displaying the bitmap on the screen, wherein
    the step of capturing a hit event further comprises capturing the hit event on the displayed bitmap and acquiring a hit coordinate corresponding to the hit event.

3. The hit testing method according to claim 1, wherein the color characteristic rendering attribute of the object comprises: an illumination attribute value, a material attribute value, or a mixing mode attribute value.

4. The hit testing method according to claim 1, wherein the step of disabling at least one color characteristic rendering attribute of the pixels of the object comprises disabling an illumination attribute value, a material attribute value, and a mixing mode attribute value of the pixels of the object.

5. The hit testing method according to claim 1, wherein the steps of determining a bitmap array element corresponding to the hit coordinate and identifying an object related to the hit event, according to an ID value associated with the bitmap array element comprise:
    querying the bitmap array for the bitmap array element that is corresponding to the hit coordinate;
    obtaining a stored ID value of an object from the bitmap array element; and
    identifying an object corresponding to the ID value as the object related to the hit event.

6. A hit testing apparatus, comprising:
    one or more processors;
    memory; and
    one or more program units stored in the memory and to be executed by the one or more processors, the one or more program units including an identifier (ID) value setting unit, a hit event capturing unit, and a hit testing unit, wherein
    the ID value setting unit is configured to replace color values of pixels of objects displayed on a screen with corresponding identifier (ID) values of the objects and store the ID values in a bitmap array, wherein each element of the bitmap array corresponds to a plurality of pixels of a respective object;

the hit event capturing unit is configured to capture a hit event and acquire a hit coordinate corresponding to the hit event; and the hit testing unit is configured to determine a bitmap array element corresponding to the hit coordinate and identify an object related to the hit event, according to the ID value associated with the bitmap array element, wherein the ID value setting unit is configured to replace color values of pixels of an object to be the identifier (ID) value of the object, disable at least one color characteristic rendering attribute of the pixels of the object, and store the ID value of the pixels in the bitmap array and the rending unit is configured to initiate only processes related to alpha channel operation during texture mapping to prevent the ID value of the object from being modified.

7. The hit testing apparatus according to claim 6, wherein the one or more program units further comprise: a rendering unit, configured to pre-render the pixels of an object to be displayed on the screen into a bitmap and display the bitmap on the screen, wherein:

the hit event capturing unit is configured to capture the hit event on the displayed bitmap and acquire a hit coordinate corresponding to the hit event.

8. The hit testing apparatus according to claim 6, wherein the color characteristic rendering attribute of the object comprises: an illumination attribute value, a material attribute value, or a mixing mode attribute value.

9. The hit testing apparatus according to claim 6, wherein the ID value setting unit is configured to disable an illumination attribute value, a material attribute value, and a mixing mode attribute value of the pixels of the object.

10. The hit testing apparatus according to claim 6, wherein the hit testing unit is configured to query the bitmap array for the bitmap array element that is corresponding to the hit coordinate, obtain a stored ID value of an object from the bitmap array element, and identify an object corresponding to the ID value as the object related to the hit event.

11. A non-transitory computer readable medium in connection with a computing device, the computer readable medium storing one or more programs to be executed by the computing device to identify a hit on an object displayed on a screen of the computing device, the one or more programs comprising instructions for:

replacing color values of pixels of objects displayed on the screen with corresponding identifier (ID) values of the objects;

storing the ID values in a bitmap array, wherein each element of the bitmap array corresponds to a plurality of pixels of a respective object;

in response to capturing a hit event, acquiring a hit coordinate on the screen corresponding to the hit event;

determining a bitmap array element corresponding to the hit coordinate; and identifying an object related to the hit event, according to the ID value associated with the bitmap array element, wherein the instructions for replacing color values of pixels of objects displayed on the screen with corresponding ID values of the objects and storing the ID values in a bitmap array further comprise instructions for:

replacing color values of pixels of an object to be the identifier (ID) value of the object;

disabling at least one color characteristic rendering attribute of the pixels of the object;

storing the ID value of the pixels in the bitmap array; and initiating only processes related to alpha channel operation during texture mapping to prevent the ID value of the object from being modified.

12. The non-transitory computer readable medium according to claim 11, wherein the one or more programs further comprise instructions for:

pre-rendering pixels of an object to be displayed on the screen into a bitmap; and displaying the bitmap on the screen, wherein the instruction for capturing a hit event further comprises instructions for capturing the hit event on the displayed bitmap and acquiring a hit coordinate corresponding to the hit event.

* * * * *